May 22, 1951 T. E. BARLOW 2,553,626
BLOW PLATE FOR CORE BLOWERS
Filed March 30, 1949

INVENTOR.
THOMAS E. BARLOW
BY
HIS ATTORNEY

Patented May 22, 1951

2,553,626

UNITED STATES PATENT OFFICE 2,553,626

BLOW PLATE FOR CORE BLOWERS

Thomas E. Barlow, Jackson, Ohio, assignor to Eastern Clay Products, Inc., a corporation of Delaware Application March 30, 1949, Serial No. 84,309

5 Claims. (Cl. 22—10)

My invention relates to foundry equipment, and more particularly concerns a core blow tube or bushing for insertion in a blow plate or core box.

One object of my invention is to provide a resilient blow tube or bushing having long, useful life while displaying a high degree of resistance to attack both by acids and alkalis, as well as a high degree of resilience coupled with non-hardening properties; and which is substantially impervious to temperatures within at least the moderate degree prevailing in normal core-forming practice, and which appreciably minimizes foundry costs, both in initial production and in subsequent use.

Another object is to provide a blow tube of the general type described which insures the production of a smooth-surfaced core characterized by its freedom of tips or bumps and its absence of distortion as a result of the usual drying process; which blow tube gives rise to a perfect seal between the blow plate and the core box, thereby preventing loss of sand as well as the resultant wear attendant thereupon.

A final object of the invention is to provide a method of producing blow tubes of the general type described, which method is simple, involving a minimum number of operational steps, employing inexpensive ingredients which are readily obtained on the market, and which, while involving operational intervals of but relatively short duration and requiring only moderate temperatures, gives rise to results which are certain, predictable and satisfactory in nature.

All these and many other objects and advantages attend upon the practice of my invention, which will in part be obvious and in part pointed out during the course of the following description, taken in the light of the accompanying drawings.

The present invention, accordingly, may be seen to reside in the several procedural and manipulative steps and in the several parts, elements and features of construction, as well as in the combination of each of the same with one or more of the others, the scope of the application of all of which is more particularly pointed out in the claims at the end of this specification.

In the drawings, wherein I have disclosed several embodiments of my invention which I prefer at present:

Figure 1 is a perspective of a bushing according to my invention, while

Figure 6 is a view similar to Figure 5, showing the tips which are normally formed on the top side of the core with blow tubes of the prior art, while

Figure 1:
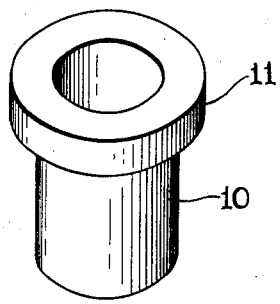
Figure 2:
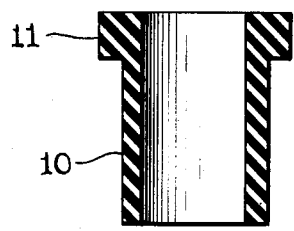
Figure 2 is a transverse sectional view of the bushing of Figure 1.

As conducive to a more thorough understanding of the present invention, it may be noted that in everyday foundry practice, it is customary, in the blowing of cores, to supply the sand from a box or magazine, suitably carried above the core box. Several techniques may be followed. Either the magazine is provided with a bottom or blow plate in which there are a series of holes which line up with similar holes on the top surface of the underlying core box, or this blow plate bottom of the magazine fits directly over an open core box which is clamped against the blow plate of the magazine. Both the blow plate and the core box top are formed of metal. In either practice, the sand is forced into the core box under a high degree of air-pressure. And, it will be appreciated that the passage through the holes in the blow plate and in the top of the core box produces considerable and rapid abrasive wear. This is true even where expensive, hardened steels are employed. Typically, a life of but twenty hours is experienced where the holes are provided in metal.

It is customary practice where such wear is incurred, to discontinue the use of that core box or that wear plate, as the case may be, until it has been repaired by insertion of liner tubes.

The liner is custom-made for each hole. When it is considered that there are large numbers of holes for each core box or each blow plate, it will be readily recognized that a considerable amount of time is consumed in completely rehabilitating a single blow plate or core box top.

Moreover, when a metal bushing or blow tube is employed, a small tip or bump of sand is left on the core at each blow hole, resulting from the sand breaking away from the mouth of the blow tube during removal. This tip remains as a protuberance from the core. And, while of course this tip can be removed by an additional hand operation, it is apparent that to remove the large number of tips left is laborious and time-consuming. Allowed to remain, this tip will cause distortion of the core, when the lightweight metal dryer is placed in position. Such distortion gives rise to stresses and strains within the core, resulting in the necessity either of scraping the core, or requiring expensive straightening and hand filing, subsequent to drying.

An additional problem presenting considerable difficulty to the workers in the art is that of positioning a metal blow plate over the top of the metal core box so as to provide a satisfactory air seal therebetween. Not only will the discharge or leakage of air through the joint result in rapid wear, due to the blasting effect of the sand, but as well, it creates a disagreeable environment and working condition for the operator, who is thereby subjected to air currents of high pressure air, together with entrained particles of sand.

An important object of my invention may, therefore, be seen to provide a blow plate and core box with blow tube or bushing which displays a high degree of resistance to wear, which tube or bushing may be readily replaced at a minimum of time and expense when such replacement is required, and which not only effectively prevents and suppresses the formation of tips or protuberances on the formed core, resulting in a core of smooth, continuous surface with uniform internal straining, but as well, provides a perfect air seal between adjacent and superposed blow plate and core box.

And now having reference to the embodiment of my invention disclosed in the several views of the drawings, I provide an elongated tubular member indicated generally by the reference number 10. This is formed of a synthetic rubber such as one selected from the Buna rubber family.

I employ a material selected from the Buna rubber family, particularly and illustratively, synthetic rubber having generally the following composition:

| | Parts |
|---|---|
| Perbunan 26[1] (Standard Oil Enjay) | 100.00 |
| Stearic acid | 1.00 |
| Zinc oxide | 5.00 |
| MPC black[2] | 60.00 |
| Dibutyl phthalate | 20.00 |
| Altax[3] (R. T. Vanderbilt Company) | 0.25 |
| Sulfur | 2.00 |
| Safex[4] (Naugatuck Chemical Company) | 1.00 |

[1] Copolymer of butadiene and acrylonitrile having an acrylonitrile content of approximately 28%.
[2] Medium processing channel black with mean diameter of particles about 28 millimicrons.
[3] Benzothiazyl disulfide.
[4] 2,4-dinitrophenyl dimethyl dithiocarbamate.

This composition I cure or vulcanize at a temperature in the approximate range of 292° F. for a period of about 14 minutes, sufficient that a hardness of approximately 60–65 Rex gauge is imparted to the finished stock. I find that this product, initially molded into proper shape, is oil-resistant, heat-resistant and extremely wear-resistant.

It should be noted that while the composition which is set forth is that which I prefer at present, it is, within certain limits, merely illustrative. Effectively, variations both in composition and in mode of curing may be employed without substantial detriment to the results obtained.

It is necessary, and this is important from the standpoint of economy, that the diameter of the bushed hole does not change in use. Because of the resilient nature of my bushing, it readily accommodates itself to the holes in the blow plate or core box top. Moreover, when replacement does become necessary, these bushings can be knocked out without damage to the walls of the hole, and replacement from stock can be accomplished on the job in but a matter of a moment.

Figure 3:
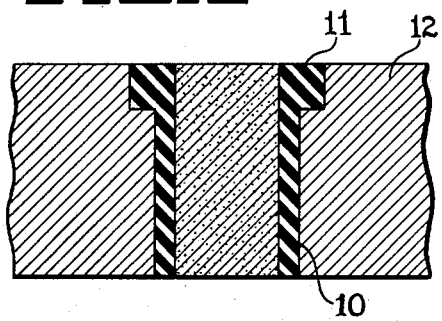
Figure 3 is a view showing the bushing as applied to a blow plate during the time when air-pressure is being applied.
Figure 4:
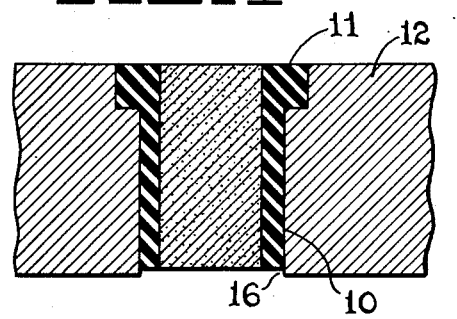
Figure 4 is a view showing the application of the bushing to a blow plate during the time while all air-pressure has been discontinued.
Figure 7:
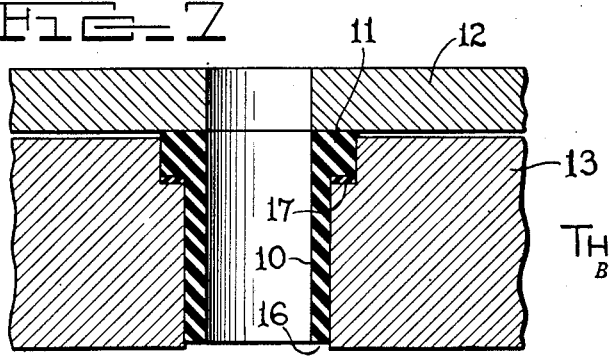
Figure 7 is a view, partly in side elevation and partly in transverse vertical section, showing the application of my new bushing between a core box and a blow plate so as to provide an air seal therebetween.

In the preferred embodiment, I form these bushings in a die which imparts the usual cylindrical form, together with a laterally and externally protruding shoulder at one end thereof. When these bushings are employed, I mill a recess into the top of the core box or of the blow plate, as the case may be. This is adapted to receive the shoulder of the bushing. This shoulder, as shown at 11, fits snugly within the blow plate 12 (Figs. 3 and 4) or core box top 13 (Fig. 7) as the case may be. It effectively retains the bushing in place against the pressure of the in-rushing air and sand.

Both initially and during the course of subsequent replacement, these bushings may simply be inserted by hand, as required, in the foundry. There is no longer any necessity of returning the core box to the pattern shop. The significance of this can be readily appreciated when contrasted with the practice hitherto existing of returning the item to the pattern shop and there tailoring a special size metal bushing for each hole in the blow plate or the core box top.

Figure 6:
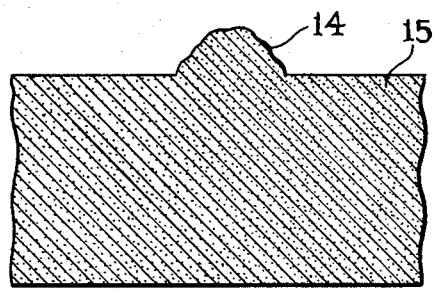
Figure 5:
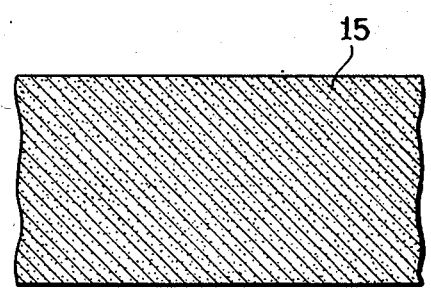
Figure 5 is a side elevation of a molded core produced with my apparatus showing the removal of the tip so as to leave a comparatively flush top surface of the core.

It has been stated hereinbefore that an important and serious problem confronting the art of producing cores has been formation of sand tips, left on the surface of the cores by the ordinary metal bushing. In all probability, this results from the fact that when the air-pressure employed in blowing the sand is terminated, and the core box or blow plate, as the case may be, is removed, the sand in the lower part of the bushing will fall out. This leaves the tip or bump on the core as hereinbefore referred to, and indicated at 14 in Figure 6, on core 15. When it is considered that the number of blow holes is relatively large, it will be recognized that a large number of such tips are formed.

Prior to drying, these tips must be removed to ensure production of perfect castings. In the drying operation, cores are baked by suspending them in a dryer during a baking operation. This dryer is simply a light metal shell of the same shape as the core, and serving as a carrier or support therefor. Should the dryer be applied over a tip on the core, the core will be distorted, and internal strains will be set up therein. Such a core would either have to be scrapped, or must be subjected to expensive filing and straightening subsequent to drying. The alternative has heretofore been to remove these tips by a hand operation at every point where the metal bushing has touched the core. Thus, in the practice as it heretofore existed, expensive treatment was required, either prior to, or subsequent to, drying in connection with these tips.

An important advantage of my invention is the elimination of these protuberant tips. Once the formation of these tips is prevented, all need of treatment, either prior to or subsequent to drying of the core, likewise is suppressed. The resultant savings both in time and in money reach important magnitude.

I accomplish my desired result in the following manner. The known metal bushings are designed to terminate flush with the blow plate or core box interior surface, as the case may be. In the use of my new blow tubes, however, I terminate the lower end thereof short of the extremity of the blow hole by from about 0.015 to about 0.030 inch, as shown at 16 in Figures 4 and 7. This means simply, as is evident from those figures, that the tubes 10 are recessed slightly within the blow plate or the core box, from the mold cavity.

The action of the resilient bushing in preventing the formation of these undesirable tips is easily explained. Under the impact of the pressure and flow of sand during the blowing operation, the resilient bushing yields and elongates till it terminates flush with the inner end of the blow plate or core box top. As soon, however, as this blowing pressure is released, the resilient bushing, stretched safely within its elastic limit, promptly retracts to its original position. In this restoring action, it shuts off and carries back with it the sand that normally would have been left as a tip. This source of distortion is thereby suppressed, and the need of hand filing of the core or additional hand operation in removing each tip is thereby avoided.

I have found that bushings of my composition continue to pinch off sand throughout their life. This contrasts sharply with bushings formed of other plastics, which quickly harden and lose their elasticity and, because of such hardening, lose their ability to pinch off the sand.

It has been commented hereinbefore that a high degree of economy is obtained by the practice of my invention, due to the high wear resistance which my new bushings display and their very long life. To illustrate this, it may be noted that on high production jobs, where the patterns are simple and the cores rapidly formed, so that the use of the blow holes is necessarily continuous, the metal bushings heretofore used may last as little as twenty hours. The costly and tedious replacement job must be undertaken, thereby fitting the production member for another twenty hours. In sharp contrast thereto, I have found that these resilient inserts display effective life from ten to twenty times as long as the metal bushings, and, under favorable conditions, have lasted as long as nine hundred hours. As has been stated hereinbefore, it is a matter of but a moment to replace these bushings by driving them out and fitting in a new one.

To facilitate a study of my new blow tubes as compared with both those formed of best grade rolled steel and those formed of the best conventional plastics, reference is had to the following table.

From the figures given above, it will be seen, using the cold rolled steel as a standard, that the best conventional plastic has approximately 6.39 times the wear resistance of the steel, while my new blow tube has a resistance of 14.91 times that of the cold rolled steel. It will further be observed from the same chart that following oil immersion for a period of forty-two hours, while the best conventional practice has increased in hardness some 24.6% of its initial hardness, my new blow tube has increased not one iota over its original hardness. Moreover, while the known plastics have increased 3.0% in thickness, the observed swelling of my new tube is only 0.4%.

It has been stated that a still further important advantage of my new blow tube resides in the manner in which it facilitates a perfect seal between the core box and its associated blow plate. When two metal surfaces are clamped together, it is extremely difficult, if not impossible, to obtain a completely tight seal therebetween. Moreover, any residual sand left from a previous blowing operation on the metal will prevent a tight fit between these parts. It will further be realized that when the fit between the two surfaces is not perfectly tight, air and sand escape between the joint, creating a condition both disagreeable to the operator, and conducing, through the lateral flow of air and sand, rapid wear of the joint.

To prevent this detrimental condition (see Figure 7), I either provide a shim 17, either of metal or plastic, under the shoulder of the bushing, within the recess in which it is received, or initially mill the recess in the core box to a depth such as to permit the shoulder of the bushing to project slightly above the core box. Then, when the box is clamped against the blow plate, the resilient bushing is compressed, and forms a most effective air seal. Substantially all possibility of air leakage through the joint between the blow plate and core box is effectively suppressed. Not only does this result in substantial increase in operational efficiency and in economy of production, but as well, the operator is no longer subjected to the uncomfortable and disagreeable situation resulting from the lateral blow-out of sand particles through the sides of the apparatus.

From the foregoing it will be seen that whether the bushing be inserted through the base plate or blow plate of the sand box, or whether it be inserted into the top half of the core box, substantial practical advantages are achieved by the use of my new tubes. As has been pointed out hereinbefore, greatly increased useful life is observed. Possibly this is due to the fact that the resilience of the bushing permits it to absorb somewhat the initial shock of the impinging sand

TABLE

*Comparative wear and durability of core tubes*

| Material | Wear Test | | Oil Immersion Test of 42 hrs. | | | |
|---|---|---|---|---|---|---|
| | | | Hardness | | Thickness | |
| | Loss in wt., gms. | Relative Resist. | Before | After | Before | After |
| | | Per cent | | | | |
| Cold Rolled Steel | .671 | 100 | | | | |
| Best Conventional Plastic | .105 | 639 | 69 | 86 | .391 | .403 |
| Buna rubber bushing | .045 | 1,491 | 68 | 68 | .247 | .248 | particles, thereby permitting distribution of the internal strain over the structure of the bushing. This would have the effect of preventing local over-stressing, which well might be accompanied by detrimental break down and failure. In any event, and regardless of the underlying theory or cause, vastly increased wear-resistant qualities, coupled with vastly increased useful life, are observed. This has the practical advantage of minimizing the necessity of knocking out and replacing the bushings at the frequent intervals heretofore required.

Not only is the foregoing advantage of long wear achieved, but as well, since, when replacement does become necessary, the resilient bushings can be knocked out, without likelihood of appreciable damage to the walls of the blow holes through which the blow tubes are inserted. But a single diameter of blow tubes need be carried in stock for a particular operation. Moreover, it is not necessary to ream the blow hole, and to tailor-make a blow tube for that particular hole out of a variety of diameters of blow tube stock carried in inventory. As well, this work can be carried out on the floor without the necessity of removal to the pattern shop, and without the requisite of painstaking work by skilled laborers. Appreciable savings are thereby accomplished, both in time and in unit labor costs.

Thus, it will be seen that there has been provided an apparatus and method in which many desirable advantages are had in matters of simplicity, economy and efficiency. And, while I have undertaken in the foregoing to disclose the practice of my invention according to a typical embodiment thereof, which I prefer at present, it is of course apparent that substantial modifications of the embodiment or practice as disclosed will readily suggest themselves to the operator skilled in the art. Accordingly, I desire the foregoing disclosure to be considered simply as illustrative, and not by way of limitation, the scope of the invention being more precisely defined in the following claims.

I claim:

1. In combination, a metal plate having a blow hole therein peripherally recessed at the inlet end thereof, and a shouldered bushing formed of Buna rubber with the shouldered portion seating in said recess and extending through said hole and terminating at least about 0.015 inch short of the outlet end of said blow tube.

2. In combination, a metal plate having a blow hole therein, and a bushing formed of Buna rubber with the shouldered portion seating in said recess and extending therethrough and terminating short of the outlet end thereof by at least 0.015 inch.

3. In combination, a blow plate having a blow hole therein peripherally recessed at the inlet end thereof, and a shouldered bushing formed of synthetic rubber having oil-resistant, heat-resistant, wear-resistant and non-hardening qualities with the shouldered portion seating in said recessed portion of the blow plate hole and extending therethrough, and terminating about 0.015 to 0.030 inch short of the outlet end of said blow hole.

4. In combination, a metal plate having a blow hole extending transversely therethrough and peripherally recessed at the inlet end thereof, a shouldered bushing formed of Buna rubber extending through said blow hole and terminating at least about 0.015 inch short of the outlet end thereof and with its shoulder received in said recess, and a shim interposed between the floor of said recess and the shoulder of said bushing to slightly elevate the top surface of the bushing above the top surface of the plate.

5. In core forming apparatus, the combination which comprises a core box top having a blow hole therethrough peripherally recessed at its inlet end, and a shouldered bushing formed of Buna rubber extending through said blow hole and terminating just short of the outlet end thereof, and having its shoulder received in said recess and maintained slightly elevated above the top surface of the box top.

THOMAS E. BARLOW.

REFERENCES CITED

The following references are of record in the file of this patent:

UNITED STATES PATENTS

| Number | Name | Date |
| --- | --- | --- |
| 875,228 | Witham | Dec. 31, 1907 |
| 1,761,522 | Elsey | June 3, 1930 |
| 1,910,032 | Mills | May 23, 1933 |
| 1,973,459 | Anderson | Sept. 11, 1934 |
| 2,129,203 | Dufour | Sept. 6, 1938 |
| 2,134,124 | Hiemann | Oct. 25, 1938 |
| 2,241,801 | Yohe | May 13, 1941 |
| 2,363,508 | Doster | Nov. 28, 1944 |
| 2,423,341 | Peterson | July 1, 1947 |
| 2,424,736 | Brams | July 29, 1947 |
| 2,435,853 | Sutherland | Feb. 10, 1948 |
| 2,457,756 | Vest | Dec. 28, 1949 |
| 2,468,672 | Judell | Apr. 26, 1949 |

OTHER REFERENCES

The Foundry, June 1949, page 232.